United States Patent
Wang et al.

(10) Patent No.: US 8,395,068 B2
(45) Date of Patent: Mar. 12, 2013

(54) DEVICE AND METHOD FOR CONTROLLING WELDING ANGLE

(75) Inventors: Feizhou Wang, Osaka (JP); Satoshi Tsuruta, Osaka (JP); Tomoyasu Nakano, Osaka (JP)

(73) Assignee: Nakata Manufacturing Co., Ltd., Osaka (JP)

( * ) Notice: Subject to any disclaimer, the term of this patent is extended or adjusted under 35 U.S.C. 154(b) by 169 days.

(21) Appl. No.: 11/922,361

(22) PCT Filed: Jun. 17, 2005

(86) PCT No.: PCT/JP2005/011170
§ 371 (c)(1),
(2), (4) Date: Dec. 17, 2007

(87) PCT Pub. No.: WO2006/134667
PCT Pub. Date: Dec. 21, 2006

(65) Prior Publication Data
US 2009/0026177 A1    Jan. 29, 2009

(51) Int. Cl.
*B23K 9/00* (2006.01)
*B23K 37/053* (2006.01)
*B23K 31/02* (2006.01)

(52) U.S. Cl. .................... 219/59.1; 219/60.2; 219/60 A; 219/607

(58) Field of Classification Search .................. 219/117, 219/57, 78.01, 59.1, 60.2, 607, 60 A
See application file for complete search history.

(56) References Cited

U.S. PATENT DOCUMENTS

| | | | | |
|---|---|---|---|---|
| 4,302,976 A | * | 12/1981 | Bull | 73/639 |
| 5,609,713 A | * | 3/1997 | Kime et al. | 156/304.2 |
| 5,762,745 A | * | 6/1998 | Hirose | 156/345.31 |
| 5,893,961 A | * | 4/1999 | Kime et al. | 156/304.2 |

FOREIGN PATENT DOCUMENTS

| | | | |
|---|---|---|---|
| JP | 54-8152 | | 1/1979 |
| JP | 54008152 A | * | 1/1979 |
| JP | 61-34908 | | 8/1986 |
| JP | 1-252379 | | 10/1989 |
| JP | 01252379 A | * | 10/1989 |
| JP | 5-16952 | | 3/1993 |

(Continued)

*Primary Examiner* — Tu B Hoang
*Assistant Examiner* — Ayub Maye
(74) *Attorney, Agent, or Firm* — Hamre, Schumann, Mueller & Larson, P.C.

(57) ABSTRACT

An object of the invention is to provide a device and a method for controlling a welding angle which is capable of resolving restrictions occurred when a conventional float type welding angle control device is used to manufacture a welded pipe, and giving full play to the ability of such a float type welding angle control device, by adopting a new mechanism for supporting and adjusting a fin roll. When the welding angle is controlled by inserting the fin roll between opposing edges of a band steel at a position located in an upstream side of squeeze rolls, the fin roll is attached to a link mechanism in which two arms are coupled so as to be pivotable within a plane defined by a pipe manufacturing line direction and a perpendicular direction thereof, and positions of gripping points of the arms are changed to adjust a position of the fin roll within the plane. Not only the mechanism of the device is simplified and an installation space can be reduced, but also the usage environment of the device and burdens for the maintenance work are considerably improved.

6 Claims, 4 Drawing Sheets

FOREIGN PATENT DOCUMENTS

| | | |
|---|---|---|
| JP | 6-277751 | 10/1994 |
| JP | 2000-210832 | 8/2000 |
| JP | 2000210832 A * | 8/2000 |
| JP | 2003-251405 | 9/2003 |

* cited by examiner

DEVICE AND METHOD FOR CONTROLLING WELDING ANGLE

TECHNICAL FIELD

The present invention relates to a welding angle control device for controlling a welding angle formed by opposing edges of a band steel from a butt welding point of both edges of the band steel in a welding process at the time of manufacturing an seam-welded steel pipe, and more particularly, to a device and a method for controlling a welding angle which are capable of easily setting an appropriate welding angle for attaining high welding quality and to maintain the same.

BACKGROUND ART

An seam-welded steel pipe is manufactured by a method in which a band steel is deformed by a series of rolls so as to have a circular section with an opening and opposing edges of the band steel are heated and welded by use of electric resistance. However, it is well-known that quality of a final product is considerably dependent on quality of the welded portion.

A so-called welding angle between the both heated edges of the band steel fused by a pressing operation of squeeze rolls is included in many factors relevant to the quality of the welded portion. Generally, as the welding angle becomes stable and large, it is easy to form a welding environment that a welding operation at the merging point becomes stable and various welding defects hardly arise.

In order to stabilize the welding angle and to securely obtain a necessary size, there is known a method in which a fin roll having a prescribed width is provided between final fin pass rolls and the squeeze rolls and inserted between the opposing edges of the band steel.

Patent Document 1: Japanese Patent Publication. No. 6-277751A

Patent Document 2: Japanese Patent Publication No. 5-16952B

Patent Document 3: Japanese Patent Publication No. 61-034908B

DISCLOSURE OF THE INVENTION

Problem to be Solved by the Invention

A fin roll is disposed between final fin pass rolls and squeeze rolls. The fin roll is frequently used in a so-called fixed type welding angle control device in which a roll unit having a fin roll shaft and a bearing chock is attached to a normal stand, and a position of the fin roll is adjustable only in a vertical direction, and in a so-called float type welding angle control device in which a position of the fin roll is adjustable in a line direction.

In the float type welding angle control device, a problem may arise in that a support mechanism and a control mechanism of the fin roll are more complex, and have disadvantage in terms of space compared with the fixed type welding angle control device. In such a float type welding angle control device, the roll unit is attached to a normal stand so as to be slidable in the vertical direction by use of a presser unit attached to the stand, Next, a slide mechanism is disposed between the stand and a base for supporting the stand. Accordingly, the position of the fin roll can be controlled in the line direction by moving the whole stand in the line direction.

In the float type welding angle control device, since the stand is not directly attached to the base, ft is necessary to provide a slide mechanism which is strong and considerably precise or an additional mechanism which reduces a clatter of the slide mechanism. Accordingly, it is necessary to provide a large space for attaching the slide mechanism or the additional mechanism between the final fin pass rolls and the squeeze rolls.

In addition, since the float type welding angle control device is disposed close to a region in which a welding process is preformed and placed in a tough environment in which sputters are scattered, it is difficult to perform a protection and maintenance of the slide mechanism. In order to ensure a space of the welding process, it is necessary to put the stand away from squeeze rolls stand by a prescribed distance. Due to interferences with the stand, a CT device or the like of a welding unit, and other peripheral units, a problem may arises in that the fin roll does not approach the squeeze rolls so that a necessary welding angle is not guaranteed.

Particularly, in the case of induction welding operation, an induction coil is disposed between the fin roll and the squeeze rolls; For this reason, when the fin roll approaches the coil, many mechanical components including the stand are strongly induced, and thus welding efficiency may considerably deteriorate. Accordingly, in many cases, it is not possible to move the fin roll to a target position because of the problem to be avoided.

Due to the problems of the installation space, the environment, the interference with the welding unit, the induction heating, or the like, when the float type welding angle control device is used, a distance between the final fin pass rolls and the squeeze rolls increases to a large extent, and influences of a camber or the like of the band steel increase, which may have a bad influence on the safety of the welding operation.

In summary, when the fixed type welding angle control device is used, the position control of the fin roll is not flexible. Accordingly, in many cases, a desired performance is not achieved. In principle, the float type welding angle control device can solve many problems of the fixed type welding angle control device. However, in such a mechanism, the position control of the fin roll in the line direction is limited by many factors, and thus it is not possible to achieve the desired performance.

An object of the invention is to provide a device and a method for controlling a welding angle that are capable of solving a limitation occurring at the time of using a known float type welding angle control device and exhibiting the advantages of the float type welding angle control device as much as possible by employing new support and adjustment mechanisms.

How to Solve the Problems

The inventors examined the welding angle control device and found that the known support and adjustment mechanisms of the fin roll cannot exhibit the advantages of the float type welding angle control device. For this reason, the inventors have contrived the invention.

In order to achieve the desired performance of the fin roll, it is very important to use an appropriate width of the fin roll. That is, when the width of the fin roll is smaller than a natural distance between opposing edges of the band steel, it is not possible to achieve the desired performance. On the contrary, when the width of the fin roll is much larger than the natural distance between opposing edges the band steel, the subsequent welding operation may be adversely influenced in that a cross sectional shape properly formed by a fin pass forming operation cannot be maintained and the edges of the band steel are damaged.

The natural distance between the opposing edges is first restricted by a fin width of the final fin pass rolls. In general, since the appropriate fin width of the fin pass rolls is different depending on a diameter of a product, the natural distance between the edges considerably varies depending on the diameter of the product. Additionally, even in a case where the fin width of the fin roll is the same, the natural distance between the opposing edges is different depending on a thickness and quality of a material and a deformation degree, due to an influence of elastic restoration.

For that reason, it is very difficult to predict the natural distance in advance. Accordingly, there is no way but calculating an optimal width of the fin roll depending on a diameter, a thickness, and a material of the product by a try and error. However, in an actual operation, it is not practical to optimize the width of the fin roll using such a complex method. Accordingly, it is known that the common method is not sufficiently used in the actual operation.

In order to solve the above-described problems, the float type welding angle control device has the following advantages. In general, the natural distance between the edges becomes slightly large due to an influence of an elastic restoration immediately after the edges pass the final fin pass rolls, but becomes small toward the squeeze rolls. As long as the position of the fin roll, can be adjusted in the line direction, it is possible to insert the fin roll between both opposing edges of the band steel at a position where the width of the fin roll can be inserted in the most appropriate distance between the edges in consideration of a variation in the distance between the edges.

In addition, in the actual operation, even when the width of the fin roll is not accurately predicted, it is possible to conveniently find a position of the fin roll capable of achieving the desired performance by controlling the position in the line direction. Of course, such a method can be carried out just by providing a compatible fin roll having various fin widths instead of many exclusive fin roll depending on types of the products.

Additionally, the obtained welding angle is different in accordance with the width of the fin roll and the inserted position of the fin roll, that is, a distance between the squeeze rolls and the fin roll. When the inserted position of the fin roll is fixed and a diameter of the product is small, the natural distance between the edges is smaller than that of the product with a large diameter. Accordingly, the width of the fin roll with a small width cannot help being used, and the obtained welding angle is considerably smaller than that of the product with a large diameter in many cases.

Meanwhile, when the inserted position of the fin roll can be adjusted, it is possible to obtain the large welding angle even in the product with a small diameter by using the fin roll with a small width at a position close to the squeeze rolls. However, as described above, the support and adjustment mechanisms of the fin roll have a structural problem, and also have an operational problem which prevents from being obtained advantages which are originally to be obtained.

The inventors considered that the major reason why much restriction occurs in the known float type welding angle control device is the fact that an adjustment variance of the fin roll in the line direction is achieved by the movement of the stand supporting the fin roll. Accordingly, in the invention, a link mechanism capable of converting a variance in other direction into that in the line direction is used as the support and adjustment mechanisms of the fin roll instead of a known mechanism in which the adjustment variance is directly allowed in the line direction.

Specifically, the fin roll is attached to a link mechanism including two arms pivotably connected to each other in a plane formed by the line direction and a perpendicular direction thereto, Subsequently, for example, positions of grip points A and B of the two arms in the vertical direction is controlled so as to control the position of the fin roll in the plane. In terms of the adjustment variance of the grip points A and B, it is possible to obtain the adjustment variance of the fin roll in the vertical direction and the line direction.

According to the invention, there is provided a welding angle control device which controls a welding angle by inserting a fin roll between opposing edges of a band steel at a position which is adjustable and is located in an upstream side of squeeze rolls adapted to be used to manufacture a welded pipe. The welding angle control device comprises a link mechanism, in which the fin roll is rotatably supported at or in the vicinity of a connection point of two link arms and an end (grip point) of at least one of the two link arms are configured to be movable, thereby being configured such that a position of the fin roll is adjustable within a plane defined by a pipe manufacturing line direction and a perpendicular direction thereof.

According to the invention, there is also provided a welding angle control device which controls a welding angle by inserting a fin roll between opposing edges of a band steel at a position which is adjustable and is located between final fin pass rolls and squeeze rolls adapted to be used to manufacture a welded pipe. The welding angle control device comprises: a stand, comprising a pair of upper and lower sliders, configured such that each position is adjustable; a pair of upper and lower arms, configured such that one ends thereof are pivotably supported on the respective sliders and the other ends are coupled to each other to constitute a link mechanism; and a fin roll rotatably supported at or in the vicinity of the coupling point of the arms.

According to the invention, there is also provided a method of controlling a welding angle by inserting a fin roll between opposing edges of a band steel at a position which is located in an upstream side of squeeze rolls adapted to be used to manufacture a welded pipe. The method comprises: attaching the fin roll to a link mechanism in which two arms are coupled so as to be pivotable within a plane defined by a pipe manufacturing line direction and a perpendicular direction thereof; and changing positions of gripping points of the arms to adjust a position of the fin roll within the plane.

Advantage of the Invention

With the link mechanism according to the invention, the position of the fin roll can be controlled in the line direction without movement of the support stand. Accordingly, it is possible to obtain the following advantageous effects (1) to (3).

(1) Since the position of the stand can be fixed and a slide mechanism in the line direction is not necessary, the mechanism of the apparatus is simplified and an installation space becomes smaller. Moreover, it is possible to remarkably reduce the burdens on usage environment and maintenance of the apparatus.

(2) Since a limitation caused by an interference and induction with a welding unit is considerably alleviated, it is possible to move the fin roll as close as possible to squeeze rolls.

(3) A distance between final fin pass rolls and the squeeze rolls is reduced as much as possible, so that it is possible to effectively suppress affections due to the usage of the control device which causes, for example, the welding operation to be unstable.

According to the welding angle control device and the welding angle control method of the invention, the above described desired performance of the device can be easily achieved as a total effect of the above described advantageous.

BEST MODE FOR CARRYING OUT THE INVENTION

Hereinafter, an embodiment of the invention will be described with reference to the drawings. The same reference numerals will be given to the same or corresponding components in the drawings and the repetitive explanations will be omitted. A welding angle, as shown in FIG. 1, refers to an angle θ between opposing edges 2 of a band steel 1 which approach toward a butt welding point P, that is, a position where the opposing edges 2 of the heated band steel 1 are fused with each other by a pressing operation of squeeze rolls (not shown).

In order to control a welding angle, a fin roll 4 is provided between final fin pass rolls 3a and 3b and squeeze rolls 5a and 5b, and then either a fin roll 4a or 4b having a prescribed width as shown in FIG. 2B is inserted between opposing edges of the band steel 1.

As shown in FIG. 3, an natural distance between opposing edges becomes slightly large because of an influence of an elastic restoration immediately after the edges pass the final fin pass rolls 3a and 3b, but becomes smaller toward the squeeze rolls 5a and 5b. At this time, when a position of the fin roll is adjustable in a line direction, it is possible to insert the fin roll between the opposing edges of the band steel at a position where the width of the fin roll matches with the distance between the opposing edges which changes as described the above.

Conventionally, as shown in FIG. 4, a roll unit including a fin roll shaft and a shaft supporting chock 7 is attached to a normal stand 6, and the roll unit is vertically slidable by use of a presser unit 8 attached to the stand 6. Further, a slide mechanism is provided between the stand 6 and a base 9 supporting the stand 6, and the whole stand 6 is movable in the line direction. However, an adjustment variance of the fin roll 4 in the line direction is just realized by moving the stand 6, and causes many restrictions to be occurred.

The invention employs a link mechanism in which a variance in other direction is converted into that in the line direction instead of a configuration in which the adjustment variance in the line direction is directly allowed. That is, as shown by a schematic view in FIG. 5, a fin roll 14 is attached to a link mechanism 10 including two arms 11 and 12 which are pivotably connected to each other in a plane formed by the vertical direction (up/down direction in the drawing) and the line direction (left/right direction in the drawing).

In other words, that is a toggle joint mechanism which includes two link arms 11 and 12. At this time, the fin roll 14 is rotatably supported on a connection point of two link arms 11 and 12, and then a position of at least one end (grip point) of two link arms 11 and 12 is adjustable. Accordingly, it is possible to adjust the position of the fin roll 4 within the plane by adjusting positions of both grip points 13A and 13B of two arms 11 and 12 in the vertical direction.

The configuration of the link mechanism 10 is not particularly limited. The fin roll 14 is rotatably supported on the connection point of the arms 11 and 12, but may be rotatably supported on a position on the further downstream side in the line direction or on a position on the further upstream side in the line direction by attaching the arms to the connection point. In the drawings, the connection point is positioned on the more downstream side in the line direction than the grip point. However, it is possible to provide an inverse configuration that the grip point is positioned on the more downstream side in the line direction than the connection point.

FIG. 6 shows an example of a welding angle control device according to the embodiment. In a link mechanism 20, an upper arm 21 including a pair of arms (21a and 21b) and a lower arm 22 including a pair of arms (22a and 22b) are pivotably connected to each other through a hinge 23. Here, shaft supporting chocks 26 at both ends of a roll shaft 25 of a fin roll 24 are attached to the arms (21a and 21b) of the upper arm 21.

The upper arm 21 and the lower arm 22 are pivotably connected to horizontal shafts of slide chocks 27 and 28 which are slidably held in U-shaped grooves of a pair of stands 30 and 31, thereby constituting the support points (grip points) of the pair of arms (21a and 21b) and (22a and 22b) of the link mechanism 20. Although the slide chocks 27 and 28 are vertically slidable in stands 30 and 31, it is possible to adjust or maintain the position thereof by use of a screw jack 32.

The stands 30 and 31 may be disposed on the downstream side of the final fin pass rolls by configuring them of a well-known independent type. Additionally, the stands 30 and 31 may be attached to the stand of the final fin pass rolls. In this case, it is possible to decrease an installation space as small as possible while ensuring safety of the apparatus. Further, the stands 30 and 31 may be attached on the upstream side of the stand of the squeeze rolls.

In the welding angle control device according to the invention, the stand may be configured as a well-known stand so long as the configuration of the link mechanism described above can be determined in consideration of arrangements of various units on the upstream side of the squeeze rolls and the functions necessary for the link mechanism 20 can be provided.

Embodiment 1

As shown in FIGS. 7A and 7B, the welding angle control device designated by the reference numeral 50 in FIG. 6 is configured such that the stands 30 and 31 are fixed to side faces on the downstream side of the stand of final fin pass rolls 40 in the line direction (left to right direction in the drawing). Accordingly, it is possible to decrease an installation space as small as possible while ensuring safety of the control device 50. Additionally, since the sliding face of the slide chock and the stand is far away from a region at which welding operation is performed, a good usage environment can be obtained.

As shown in FIG. 7A, when both slide chocks 27 and 28, that is, the grip points of both arms 21 and 22 are moved so as to close to each other, the fin roll 24 moves close to the squeeze rolls 5a and 5b on the downstream side. Conversely, when both slide chocks 27 and 28 are moved so as to apart from each other, the fin roll 24 moves to the fin pass rolls 3a and 3b on the upstream side.

As it is clear from FIG. 7A, even in a position where the fin roll 24 moves as close as possible to the squeeze rolls 5a and 5b, a CT device 51, an induction coil 52, (see also FIG. 4, or the like thereabove do not interfere with the welding unit, and thus a mechanical component which can be strongly induction-heated by the induction coil is limited. Accordingly, it is possible to easily ensure a space necessary for the welding operation.

In the conventional apparatus shown in FIG. 4, since the roll unit of the fin roll 4 is attached to the stand 6, it is necessary to open/close the upper portion of the stand 6 or to attach/detach a presser unit to/from the roll unit at the time of exchanging the fin roll 4. However, in the embodiment, since the roll unit is exchanged in a region other than the stands 30 and 31, and it is not necessary to access the presser unit, the exchanging operation is considerably simplified.

Industrial Applicability

According to the invention, it is possible to simply maintain an appropriate welding angle in order to obtain a good welding quality at the time of manufacturing various welded pipe of which a welding angle needs to be controlled other than a seam-welded steel pipe, irrespective of a welding method such as a laser welding.

DESCRIPTION OF REFERENCE NUMERALS AND SIGNS

Figure 1:
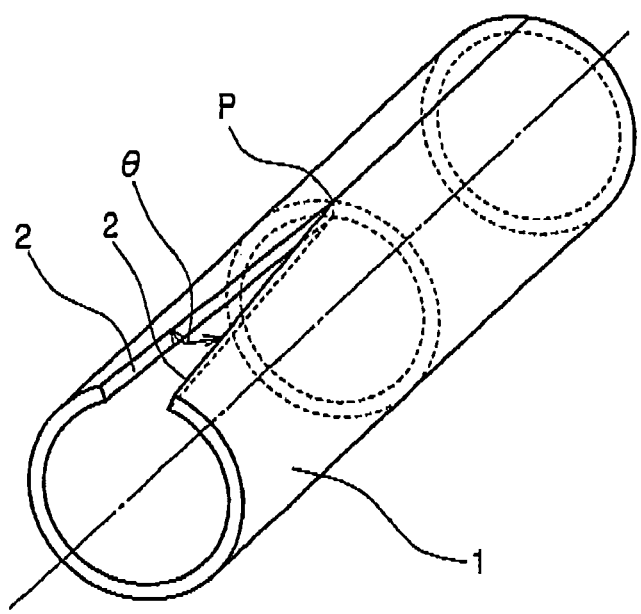
FIG. 1 is a perspective view of a band steel and a pipe for explaining a welding angle.
Figure 2A:
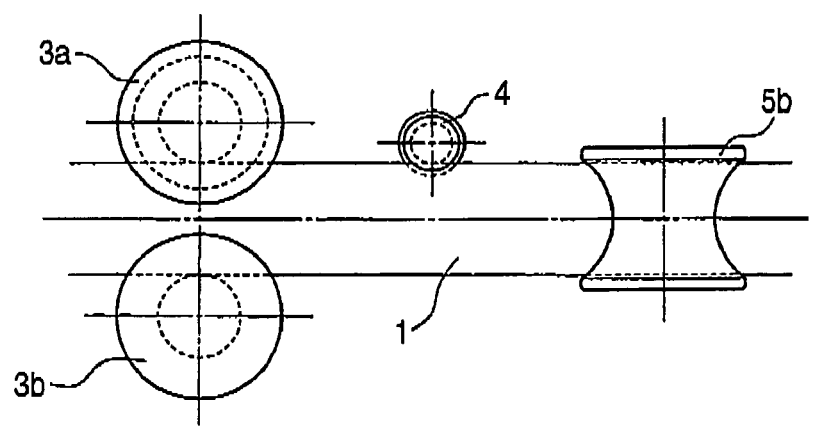
FIG. 2A is a view for explaining a positional relation of final fin pass rolls, a fin roll, and squeeze rolls.
Figure 2B:
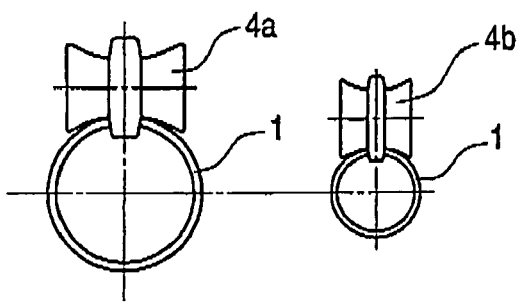
FIG. 2B is a view showing the band steel when viewed from a line direction for explaining a setting operation of the welding angle through the use of the fin roll.
Figure 3:
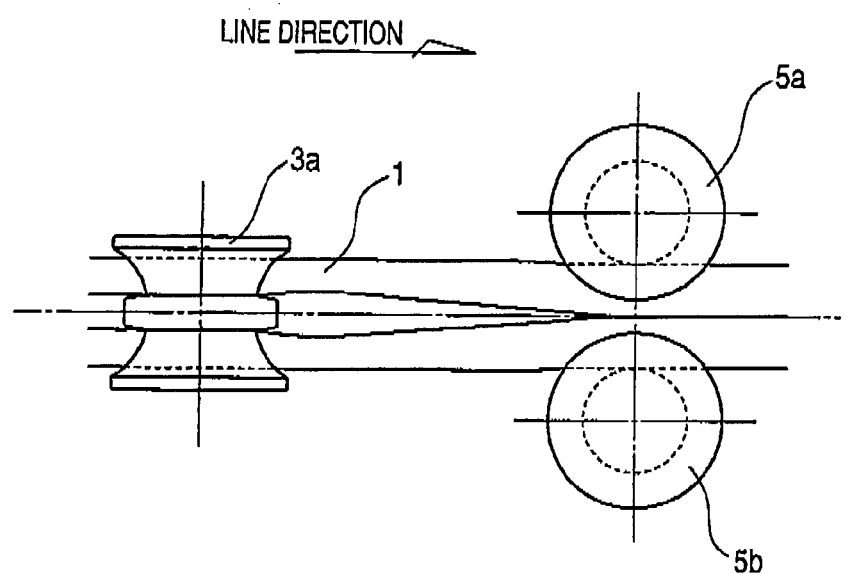
FIG. 3 is a view for explaining a variation in a distance between opposing edges of the band steel at a position between the final fin pass rolls and the squeeze rolls.
Figure 4:
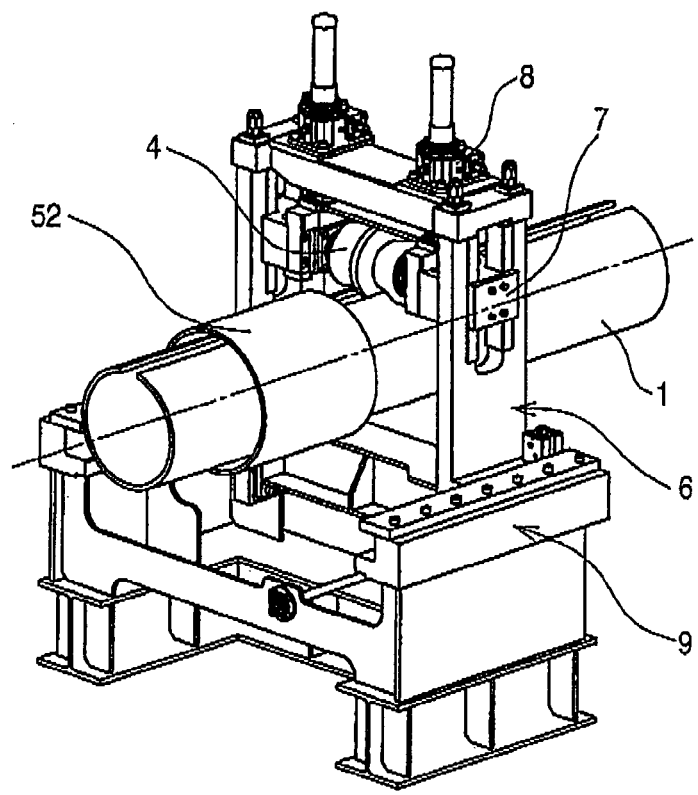
FIG. 4 is a perspective view showing a configuration of a conventional float type welding angle control device.
Figure 5:
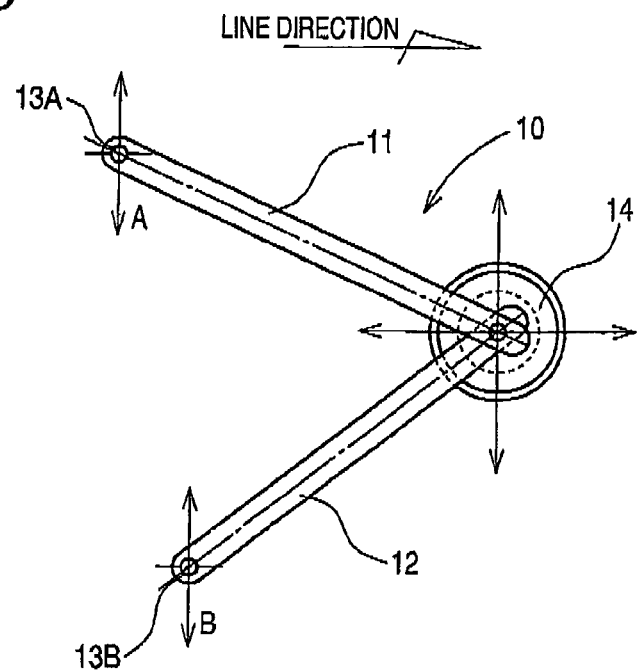
FIG. 5 is a view showing arms constituting a fin roll position adjusting mechanism according to the invention.
Figure 6:
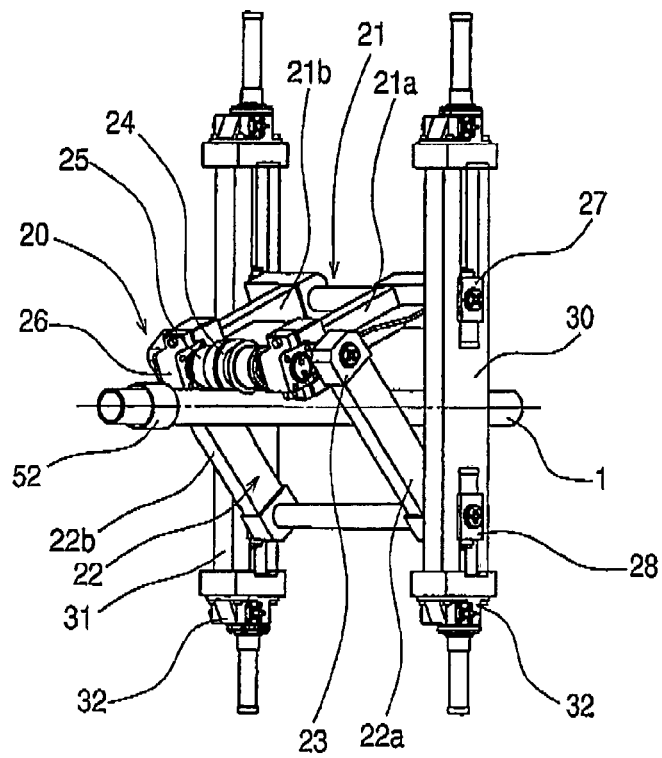
FIG. 6 is a perspective view showing an embodiment of the invention.
Figure 7A:
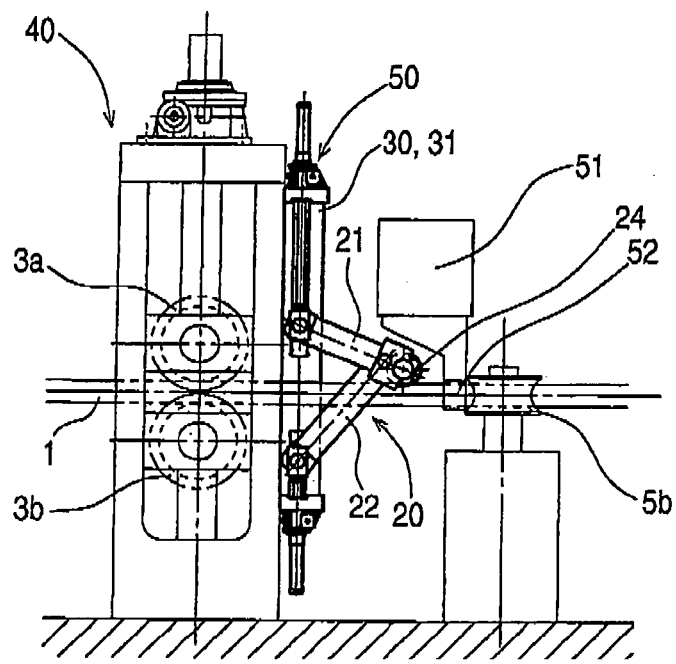
FIGS. 7A and 7B are views showing final fin pass rolls, a fin roll, and squeeze rolls according to the embodiment of the invention.
Figure 7B:
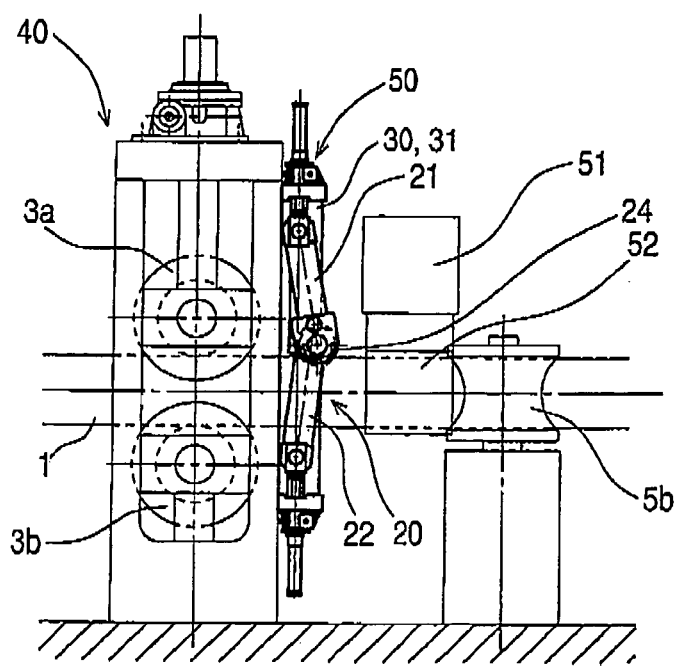

P: BUTT WELDING POINT
1: BAND STEEL
2: EDGE (OF BAND STEEL)
3a, 3b: FIN PASS ROLL
4, 4a, 4b, 14, 24: FIN ROLL
5a, 5b: SQUEEZE ROLL
6, 30, 31: STAND
7, 26: SHAFT SUPPORT CHOCK
8: PRESSER UNIT
9: BASE
10, 20: LINK MECHANISM
11, 12, 21, 22, 21a, 21b, 22a, 22b: ARM
13A, 13B: GRIP POINT
21: UPPER ARM
22: LOWER ARM
23: HINGE
25: ROLL SHAFT
27, 28: SLIDE CHOCK
32: SCREW JACK
40: STAND OF FIN PASS ROLL
50: CONTROLLER
51: CT DEVICE
52: INDUCTION COIL

The invention claimed is:

1. A welding angle control device adapted to be located between final fin pass rolls and squeeze rolls which are adapted to be used to manufacture a welded pipe, the welding angle control device comprising:
    intermediate stands, adapted to be located between a first stand supporting the final fin pass rolls and a second stand supporting the squeeze rolls, the intermediate stands comprising a pair of upper slots and a pair of lower slots, and a pair of upper slide chocks and a pair of lower slide chocks which are provided in each of said pair of upper slots and pair of lower slots respectfully;
    a pair of upper arms, each of the upper arms having a first end pivotably supported by the upper slide chocks;
    a pair of lower arms, each of the lower arms having a first end pivotably supported by the lower slide chocks and a second end respectively coupled to the upper arms to constitute a link mechanism; and
    a fin roll rotatably supported at a coupling point of the pair of upper arms and the pair of lower arms, and adapted to be inserted between opposing edges of a band material,
    wherein the intermediate stands are attached to the first stand, and the upper slide chocks and the lower slide chocks are slidable only in a vertical direction, so that a position of the fin roll is adjustable in both the vertical direction and the pipe manufacturing line direction, by adjusting positions of the upper slide chocks and the lower slide chocks in the vertical direction.

2. The welding angle control device as set forth in claim 1, wherein:
    the intermediate stands are attached to a downstream side of the first stand in the pipe manufacturing line direction.

3. The welding angle control device as set forth in claim 1, wherein:
    the intermediate stands are attached to a downstream side of the first stand in the pipe manufacturing line direction.

4. A welding angle control device adapted to be located between final fin pass rolls and squeeze rolls which are adapted to be used to manufacture a welded pipe, the welding angle control device comprising:
    intermediate stands, adapted to be located between a first stand supporting the final fin pass rolls and a second stand supporting the squeeze rolls, the intermediate stands comprising a pair of upper slots and a pair of lower slots, and a pair of upper and lower slide chocks which are provided in each of said pair of upper slots and pair of lower slots respectfully;
    a pair of upper arms, each of the upper arms having a first end pivotably supported by the upper slide chocks;
    a pair of lower arms, each of the lower arms having a first end pivotably supported by the lower slide chocks and a second end respectively coupled to the other end of the upper arms to constitute a link mechanism; and
    a fin roll, rotatably supported by the pair of upper arms and the pair of lower arms at a position in an upstream side or a downstream side of the coupling point in a pipe manufacturing line direction, the fin roll being adapted to be inserted between opposing edges of a band material,
    wherein the intermediate stands are attached to the first stand, and the upper slide chocks and the lower slide chocks are slidable only in a vertical direction, so that a position of the fin roll is adjustable in both the vertical direction and the pipe manufacturing line direction, by adjusting positions of the upper slide chocks and the lower slide chocks in the vertical direction.

5. The welding angle control device as set forth in claim 4, wherein:
    the intermediate stands are attached to a downstream side of the first stand in the pipe manufacturing line direction.

6. The welding angle control device as set forth in claim 4, wherein:
    the intermediate stands are attached to a downstream side of the first stand in the pipe manufacturing line direction.

* * * * *